US011367096B1

(12) United States Patent
Scott et al.

(10) Patent No.: US 11,367,096 B1
(45) **Date of Patent: *Jun. 21, 2022**

(54) INDIVIDUALIZED INCENTIVES TO IMPROVE FINANCING OUTCOMES

(71) Applicant: Block, Inc., San Francisco, CA (US)

(72) Inventors: John Bryan Scott, San Francisco, CA (US); Brian Boates, San Francisco, CA (US); Adam Jeremy Fern, San Francisco, CA (US); Andrew Kimball, Moraga, CA (US)

(73) Assignee: BLOCK, INC., San Francisco, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/658,198

(22) Filed: Oct. 21, 2019

Related U.S. Application Data

(63) Continuation of application No. 14/676,678, filed on Apr. 1, 2015, now Pat. No. 10,453,086.

(51) Int. Cl.
*G06Q 30/02* (2012.01)
*G06Q 20/24* (2012.01)
(Continued)

(52) U.S. Cl.
CPC ....... *G06Q 30/0215* (2013.01); *G06Q 20/202* (2013.01); *G06Q 20/24* (2013.01); *G06Q 20/322* (2013.01)

(58) Field of Classification Search
CPC .. G06Q 30/0215; G06Q 20/202; G06Q 20/24; G06Q 20/322
See application file for complete search history.

(56) References Cited

U.S. PATENT DOCUMENTS 5,696,907 A 12/1997 Tom
5,963,919 A 10/1999 Brinkley et al.
(Continued)

FOREIGN PATENT DOCUMENTS

JP 2004-118547 A 4/2004
WO 99/03076 A1 1/1999

OTHER PUBLICATIONS

Notice of Allowance dated Sep. 17, 2020, for U.S. Appl. No. 14/602,486, of Fern A., A. et al., filed Jan. 22, 2015.
(Continued)

*Primary Examiner* — David J Stoltenberg
*Assistant Examiner* — Michael J Cross
(74) *Attorney, Agent, or Firm* — Mattingly & Malur, PC

(57) ABSTRACT

In some examples, a payment processing system may send, based on transaction information received from a plurality of merchant devices, an incentive for a first merchant to whom financing has been provided, to achieve a performance target during a specified time period. For instance, the incentive may include a proposed modification to repayment terms for the financing to be implemented if the merchant achieves the performance target during the specified time period. The system may track transactions processed for the first merchant during the specified time period. Based on the tracking, the system may determine that the merchant has achieved the performance target during the specified time period for receiving the incentive, and may implement the modification of the repayment terms for the financing for the first merchant.

20 Claims, 6 Drawing Sheets

(51) Int. Cl.
*G06Q 20/20* (2012.01)
*G06Q 20/32* (2012.01)

(56) References Cited

U.S. PATENT DOCUMENTS 6,249,774 B1 6/2001 Roden et al.
6,307,576 B1 10/2001 Rosenfeld
6,826,544 B1 11/2004 Johnson
6,941,281 B1 9/2005 Johnson
6,996,538 B2 2/2006 Lucas
7,035,821 B1 4/2006 Smith, II et al.
7,103,570 B1 9/2006 Morea et al.
7,181,427 B1 2/2007 DeFrancesco et al.
7,607,577 B1 10/2009 Yu et al.
7,797,231 B1 9/2010 Loeb et al.
7,953,653 B2 5/2011 Siggers et al.
8,150,764 B2 4/2012 Crowe et al.
8,239,227 B2 8/2012 Megiddo et al.
8,606,695 B1 12/2013 Arora et al.
8,666,847 B1 3/2014 Blank et al.
8,732,040 B1 5/2014 Prabhune et al.
9,519,892 B2 12/2016 Martell et al.
9,727,912 B1 8/2017 Poursartip et al.
9,786,005 B1 10/2017 Poursartip et al.
9,824,394 B1 11/2017 Boates et al.
9,836,786 B1 12/2017 Baker
9,892,458 B1 2/2018 Shearer et al.
9,984,412 B1 5/2018 Poursartip et al.
10,019,698 B1 7/2018 Scott et al.
10,062,109 B1 8/2018 Poursartip et al.
10,346,907 B1 7/2019 Poursartip et al.
10,445,826 B1 10/2019 Poursartip et al.
10,453,086 B1 10/2019 Scott et al.
10,455,826 B2 10/2019 Palomares et al.
10,565,642 B1 2/2020 Cieri et al.
10,607,286 B1 3/2020 Poursartip et al.
10,902,512 B1 1/2021 Fern et al.
2002/0138412 A1 9/2002 Englert
2002/0152139 A1 10/2002 Hogan
2002/0174061 A1 11/2002 Srinivasan et al.
2003/0101107 A1 5/2003 Agarwal et al.
2003/0130959 A1 7/2003 Rosenbaum
2004/0054625 A1 3/2004 Kellogg et al.
2004/0064398 A1 4/2004 Browne et al.
2004/0193540 A1 9/2004 Brown et al.
2006/0095350 A1 5/2006 Hall et al.
2006/0095367 A1 5/2006 Iverson
2006/0224480 A1 10/2006 Bent et al.
2007/0156579 A1 7/2007 Manesh
2007/0156584 A1 7/2007 Barnes et al.
2007/0174191 A1 7/2007 Keaton et al.
2007/0244779 A1 10/2007 Wolff
2007/0255635 A1 11/2007 Multer et al.
2007/0255653 A1 11/2007 Tumminaro et al.
2008/0033825 A1* 2/2008 Goldin ............... G06Q 30/0219 705/14.21
2008/0052229 A1 2/2008 Sheinker et al.
2008/0086410 A1 4/2008 MacGuire
2008/0195534 A1 8/2008 Landis et al.
2009/0006249 A1 1/2009 Morgan et al.
2009/0043697 A1 2/2009 Jacobs et al.
2009/0048884 A1 2/2009 Olives et al.
2009/0187482 A1 7/2009 Blount et al.
2010/0017324 A1 1/2010 Brownhill et al.
2010/0223154 A1 9/2010 Frohwein et al.
2010/0228651 A1 9/2010 Becerra et al.
2010/0299251 A1 11/2010 Thomas
2010/0306071 A1 12/2010 Kay
2011/0166987 A1 7/2011 Hu et al.
2011/0191173 A1* 8/2011 Blackhurst ......... G06Q 30/0251 705/14.49
2011/0191239 A1* 8/2011 Blackhurst ......... G06Q 30/0255 705/39
2011/0251870 A1 10/2011 Tavares et al.
2012/0022945 A1 1/2012 Falkenborg et al.
2012/0054097 A1 3/2012 Frohwein et al.
2012/0066033 A1 3/2012 Frohwein et al.
2012/0089436 A1 4/2012 Tavares et al.
2012/0173416 A1 7/2012 Bayne
2012/0209734 A1 8/2012 Brooks et al.
2012/0233010 A1 9/2012 Frohwein et al.
2012/0233090 A1 9/2012 Tavares et al.
2012/0239552 A1 9/2012 Harycki
2012/0271765 A1 10/2012 Cervenka et al.
2013/0085804 A1 4/2013 Leff et al.
2013/0138544 A1 5/2013 Chapman
2013/0211892 A1 8/2013 Frohwein et al.
2013/0268417 A1 10/2013 Sgueglia
2014/0006202 A1 1/2014 Frohwein et al.
2014/0025525 A1 1/2014 Frohwein et al.
2014/0058804 A1 2/2014 Zhou et al.
2014/0067677 A1 3/2014 Ali et al.
2014/0143405 A1 5/2014 Pavlidis et al.
2014/0244361 A1 8/2014 Zhang et al.
2014/0244479 A1 8/2014 White et al.
2014/0245210 A1 8/2014 Battcher et al.
2014/0358766 A1 12/2014 Nayyar et al.
2015/0026035 A1 1/2015 Showalter
2015/0095210 A1 4/2015 Grech et al.
2015/0149333 A1 5/2015 Yaplee et al.
2015/0161606 A1 6/2015 Lee
2015/0168478 A1 6/2015 Ohlen et al.
2015/0254768 A1 9/2015 Menon et al.
2015/0269578 A1 9/2015 Subramanian et al.
2016/0019614 A1* 1/2016 Dziuk ................ G06Q 30/0613 705/38
2016/0055427 A1 2/2016 Adjauote
2016/0210634 A1 7/2016 Trujillo
2017/0213282 A1* 7/2017 Dziuk .................. G06Q 40/025
2018/0211212 A1 7/2018 Chin
2020/0219102 A1 7/2020 Varma et al.

OTHER PUBLICATIONS

Proquest, "Intuit Launches New Personalizable Small Business Channel on Quicken.com Web Site", Business/Technology Editors, Business Wire New York, Jul. 28, 1998, pp. 1-3.

Non-Final Office Action dated Mar. 18, 2020, for U.S. Appl. No. 14/602,486, of Cieri, M.M, et al., filed Oct. 23, 2014.

Non-Final Office Action dated Sep. 29, 2020, for U.S. Appl. No. 16/808,860, of Poursartip, A., et al., filed Mar. 4, 2020.

"Oracle Retail Advanced Inventory Planning," www.oracle.com, pp. 1-2 (2013).

Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.

Comptroller's Handbook, "Accounts Receivable and Inventory Financing," Comptroller of the Currency Administrator of National Banks, published Mar. 2000, pp. 1-78.

Giusti, A.C., "Want More Revenue? Enhance The Offers: Carefully matching merchants with the right products and ensuring agents know them well can dictate how much an ISO may earn from value-added services," ISO & Agent 7.4, dated May 1, 2011, pp. 1-2.

Greene, J.H., "Production and Inventory Control Handbook," The McGraw-Hill, Third Edition, pp. 287 (Year: 1997).

Greene, J.H., "Production and Inventory Control Handbook," The McGraw-Hill, Third Edition, pp. 290 (Year: 1997).

Leung, L., "PayPal ramps up small-business loans," The Orange County register, Journal—Gazette [Ft. Wayne, Ind], dated Feb. 10, 2014, pp. 1-2.

Non-Final Office Action dated Jan. 8, 2015, for U.S. Appl. No. 14/491,958, of Poursartip, A., et al., filed Sep. 19, 2014.

Non-Final Office Action dated Mar. 27, 2015, for U.S. Appl. No. 14/491,965, of Poursartip, A., et al., filed Sep. 19, 2014.

Non-Final Office Action dated Mar. 27, 2015, for U.S. Appl. No. 14/491,967, of Poursartip, A., et al., filed Sep. 19, 2014.

(56) References Cited

OTHER PUBLICATIONS

Final Office Action dated May 20, 2015, for U.S. Appl. No. 14/491,958, of Poursartip, A., et al., filed Sep. 19, 2014.
Advisory Action dated Jul. 27, 2015, for U.S. Appl. No. 14/491,958, of Poursartip, A., et al., filed Sep. 19, 2014.
Non-Final Office Action dated Aug. 27, 2015, for U.S. Appl. No. 14/540,947, of Baker, G. K., et al., filed Nov. 13, 2014.
Final Office Action dated Oct. 8, 2015, for U.S. Appl. No. 14/491,967, of Poursartip, A., et al., filed Sep. 19, 2014.
Final Office Action dated Nov. 6, 2015, for U.S. Appl. No. 14/491,965, of Poursartip, A., et al., filed Sep. 19, 2014.
Non-Final Office Action dated Jan. 5, 2016, for U.S. Appl. No. 14/491,958, of Poursartip, A., et al., filed Sep. 19, 2014.
Non-Final Office Action dated Feb. 12, 2016, for U.S. Appl. No. 14/540,947, of Baker, G. K., et al., filed Nov. 13, 2014.
Non-Final Office Action dated Sep. 9, 2016, for U.S. Appl. No. 14/540,947, of Baker, G. K., filed Nov. 13, 2014.
Non-Final Office Action dated May 5, 2016, for U.S. Appl. No. 14/491,967, of Poursartip, A., et al., filed Sep. 19, 2014.
Non-Final Office Action dated Jun. 17, 2016, for U.S. Appl. No. 14/491,965, of Poursartip, A., et al., filed Sep. 19, 2014.
Non-Final Office Action dated Jun. 17, 2016, for U.S. Appl. No. 14/622,605, of Scott, J.B., et al., filed Feb. 13, 2015.
Final Office Action dated Oct. 21, 2016, for U.S. Appl. No. 14/491,967, of Poursartip, A., et al., filed Sep. 19, 2014.
Non-Final Office Action dated Nov. 28, 2016, for U.S. Appl. No. 14/491,963, of Poursartip, A., et al., filed Sep. 19, 2014.
Non-Final Office Action dated Dec. 19, 2016, for U.S. Appl. No. 14/491,965, of Poursartip, A., et al., filed Sep. 19, 2014.
Examiner's Answer to Appeal Brief dated Jan. 27, 2017, for U.S. Appl. No. 14/491,958, of Poursartip, A., et al., filed Sep. 19, 2014.
Non-Final Office Action dated Feb. 10, 2017, for U.S. Appl. No. 14/622,605, of Scott, J.B., et al., filed Feb. 13, 2015.
Notice of Allowance dated Mar. 30, 2017, for U.S. Appl. No. 14/491,967, of Poursartip, A., et al., filed Sep. 19, 2014.
Final Office Action dated Apr. 6, 2017, for U.S. Appl. No. 14/540,947, of Baker, G.K., filed Nov. 13, 2014.
Non-Final Office Action dated May 10, 2017, for U.S. Appl. No. 14/602,486, of Fern, A.J., et al., filed Jan. 22, 2015.
Non-Final Office Action dated May 16, 2017, for U.S. Appl. No. 14/676,678, of Scott, J.B., et al., filed Apr. 1, 2015.
Notice of Allowance dated Jun. 7, 2017, for U.S. Appl. No. 14/491,963, of Poursartip, A., et al., filed Sep. 19, 2014.
Notice of Allowance dated Jun. 22, 2017, for U.S. Appl. No. 14/540,947, of Baker, G.K., filed Nov. 13, 2014.
Final Office Action dated Jul. 27, 2017, for U.S. Appl. No. 14/491,965, of Poursartip, A., et al., filed Sep. 19, 2014.
Notice of Allowance dated Sep. 22, 2017, for U.S. Appl. No. 14/622,605, of Scott, J.B., et al., filed Feb. 13, 2015.
Non-Final Office Action dated Nov. 8, 2017, for U.S. Appl. No. 15/725,591, of Poursartip, A., et al., filed Oct. 5, 2017.
Final Office Action dated Dec. 29, 2017, for U.S. Appl. No. 14/676,678, of Scott, J.B., et al., filed Apr. 1, 2015.
Final Office Action dated Jan. 9, 2018, for U.S. Appl. No. 14/602,486, of Fern, A.J., et al., filed Jan. 22, 2015.
Notice of Allowance dated Jan. 19, 2018, for U.S. Appl. No. 14/491,965, of Poursartip, A., et al., filed Sep. 19, 2014.
Non-Final Office Action dated Mar. 8, 2018, for U.S. Appl. No. 14/522,287, of Cieri, M.M, et al., filed Oct. 23, 2014.
Notice of Allowance dated May 2, 2018, for U.S. Appl. No. 15/725,591, of Poursartip, A., et al., filed Oct. 5, 2017.
Final Office Action dated Oct. 3, 2018, for U.S. Appl. No. 14/522,287, of Cieri, M.M, et al., filed Oct. 23, 2014.
Non-Final Office Action dated Oct. 5, 2018, for U.S. Appl. No. 16/111,278, of Poursartip, A., et al., filed Aug. 24, 2018.
Non-Final Office Action dated Oct. 18, 2018, for U.S. Appl. No. 14/676,678, of Scott, J.B., et al., filed Apr. 1, 2015.
Advisory Action dated Dec. 13, 2018, for U.S. Appl. No. 14/522,287, of Cieri M., M., et al., filed Oct. 23, 2014.
Non Final Office Action dated Jan. 25, 2019, for U.S. Appl. No. 14/602,486, of Fern, A.J., et al., filed Jan. 22, 2015.
Notice of Allowance dated Feb. 21, 2019, for U.S. Appl. No. 16/111,278, of Poursartip, A., et al., filed Aug. 24, 2018.
Non-Final Office Action dated Apr. 5, 2019, for U.S. Appl. No. 14/522,287, of Cieri, M.M., et al., filed Oct. 23, 2014.
Non Final Office Action dated May 31, 2019, for U.S. Appl. No. 15/670,305, of Poursartip, A., et al., filed Aug. 7, 2017.
Notice of Allowance dated Jun. 4, 2019, for U.S. Appl. No. 14/491,958, of Poursartip, A., et al., filed Sep. 19, 2014.
Notice of Allowance dated Jun. 12, 2019, for U.S. Appl. No. 14/676,678 of Scott, J.B., et al., filed Apr. 1, 2015.
Final Office Action dated Aug. 2, 2019, for U.S. Appl. No. 14/602,486, of Fern, A.J., et al., filed Jan. 22, 2015.
Notice of Allowance dated Sep. 30, 2019, for U.S. Appl. No. 14/522,287, of Cieri, M.M., et al., filed Oct. 23, 2014.
Notice of Allowance dated Oct. 31, 2019, for U.S. Appl. No. 15/670,305, of Poursartip, A., et al., filed Aug. 7, 2017.
Non-Final Office Action dated Jan. 14, 2021, for U.S. Appl. No. 16/777,522, of Cieri, M.M, et al., filed Jan. 30, 2020.
Final Office Action dated Mar. 1, 2021, for U.S. Appl. No. 16/808,860, of Poursartip, A., et al., filed Mar. 4, 2020.
Pre-Interview First Office Action dated Apr. 5, 2021, for U.S. Appl. No. 16/596,903, of Poursartip, A., et al., filed Oct. 9, 2019.
Notice of Allowance dated Apr. 21, 2021, for U.S. Appl. No. 16/808,860, of Poursartip, A., et al., filed Mar. 4, 2020.
First Action Interview Office Action dated Jun. 17, 2021, for U.S. Appl. No. 16/596,903, of Poursartip, A., et al., filed Oct. 9, 2019.

* cited by examiner

INDIVIDUALIZED INCENTIVES TO IMPROVE FINANCING OUTCOMES

CROSS-REFERENCE TO RELATED APPLICATION

This application is a continuation of, and claims priority to, U.S. patent application Ser. No. 14/676,678, filed Apr. 1, 2015, issued as U.S. Pat. No. 10,453,086, and which is incorporated by reference herein.

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. The mobile computing device then transmits the payment card information and other transaction information to a payment processing system to be processed. Typically, this information is transmitted over an internet connection and stored for later batch transmission if an internet connection is not available.

A merchant using a mobile payment system may desire additional funds, but may not desire to fill out a loan application, be subjected to a credit check, or be required to make regular loan payments. Similarly, a payment processing service provider may desire to provide additional funds to merchants, but may be not have an efficient way to encourage merchants to receive additional funds or participate in other services provided by the payment processing service provider. For example, some payment processing service providers may simply default to advertising or providing broadly sweeping or static incentives to bring in and/or retain business.

BRIEF DESCRIPTION OF THE DRAWINGS

The techniques described herein are illustrated by way of example, and not by way of limitation, in the figures of the accompanying drawings, in which like reference numerals are used to refer to similar elements.

Figure 1:
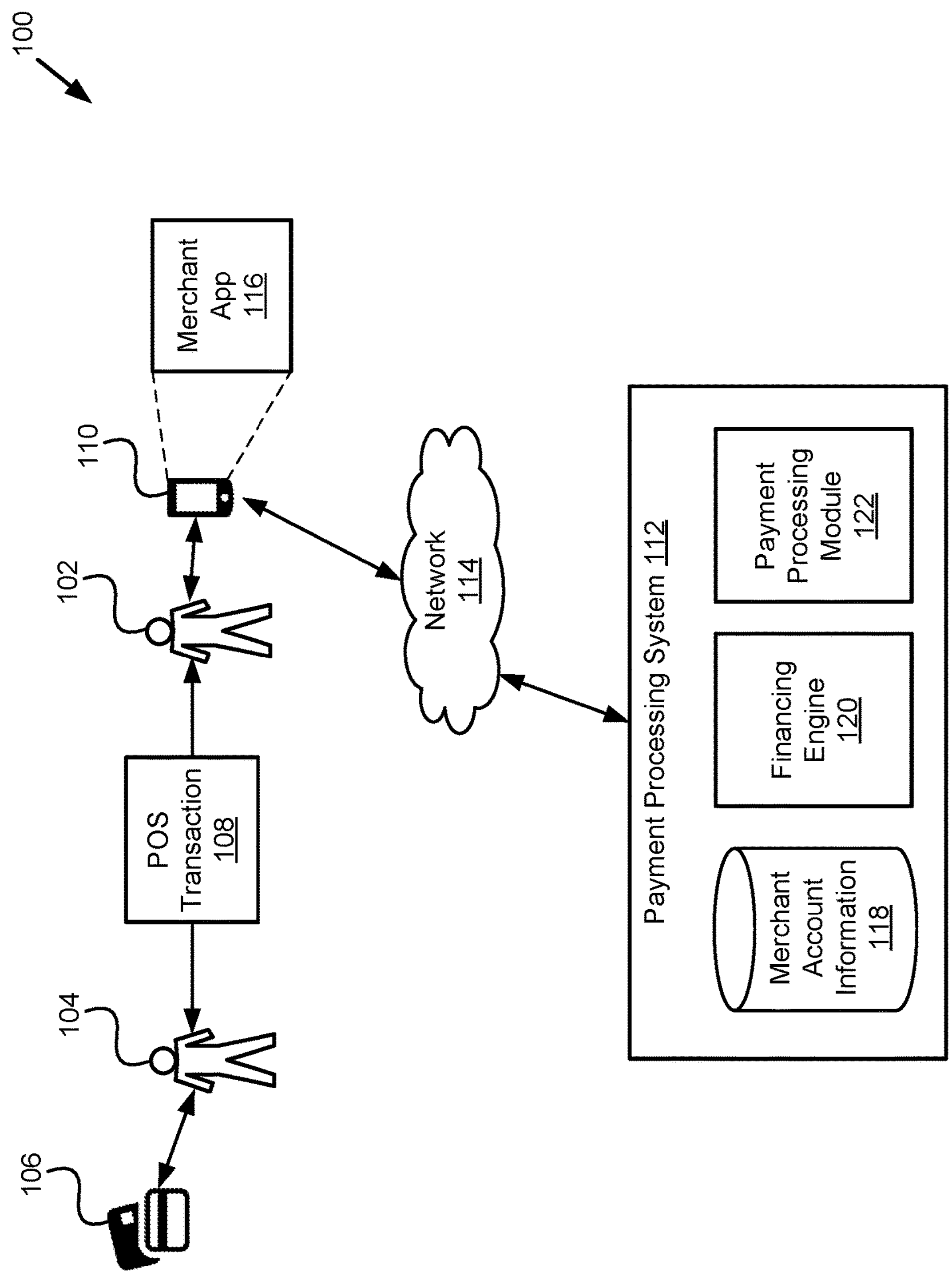
FIG. 1 illustrates an example architecture of a payment processing system for enabling transactions between merchants and buyers and providing financing to merchants.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Various embodiments of the techniques introduced herein are discussed in detail below. While specific embodiments are discussed, it should be understood that this is done for illustration purposes only. It will be recognized that other components and configurations may be used without parting from the spirit and scope of the techniques introduced herein.

Systems and methods in accordance with various embodiments of the techniques described in the present disclosure overcome one or more of the above-referenced and other deficiencies in conventional approaches to providing financing, e.g., cash advances, loans, or the like, to merchants. In particular, the techniques provide for evaluating financial transactions conducted by a merchant through a payment processing system and, based on the evaluation, providing the merchant with one or more offers of financing or modification of current financing arrangements in order to induce activity by the merchant. It will be recognized, that the techniques discussed herein can apply to various financing methods, such as cash advances and loans, although one or the other may be used for descriptive purposes in the examples below. The techniques disclosed herein, whether discussed in the examples as cash advance techniques or loan techniques, can be practiced with equal applicability as a cash advance or loan. Additionally, the terms "financing" and "cash advance" are used interchangeably herein to indicate any advancement of funds, financing, funding, loan, etc.

The approaches described herein allow a payment processing system to use merchant profile information (e.g., financial transaction history, customers, locations, type of business, etc.) to make an offer defining an incentive and an action required of the merchant to receive the incentive (e.g., achieving a performance target). The incentive may include, for example, adjusting financing terms of a financing arrangement between the merchant and the payment processing system or creating a new financing arrangement. The determination of whether a merchant qualifies for an offer can be based entirely on an evaluation of the merchant's interactions with the payment processing system including, for example, previously conducted financial transactions, merchant profile information, and the like. Changes to the terms can be minor or significant and occur before or after a merchant has received financing. A payment processing system can use the information known about a merchant to determine one or more incentives and required merchant actions. As a result, an offer may promote engagement with merchants, promote financing repayment and performance by merchants, and otherwise beneficially influence the behavior of the merchant.

An example of influencing behavior of the merchant may be providing performance targets for the merchant to achieve as a required merchant action associated with an incentive. The performance targets may be based on information known about a merchant and/or the merchant's customers and may be formulated to encourage the merchant to modify behavior over a particular time span. The particular time span may be short or long term based on the desires of the payment processing system. For example, the particular time span may be: before lunch, before close of business today, the next hour, the next day, this weekend, the next week, the next month, before the end of this quarter, etc.

In one embodiment, the performance target may be to increase repeat customers. For example, if, for a threshold number of customers, the merchant conducts multiple transactions with each of the threshold number of customers over a time span, then the payment processing system may cease to collect financing repayments on the repeat transactions, thereby encouraging the merchant to perform more transactions. Similarly, the performance target may be to enter into financial transactions with new customers. If the merchant conducts financial transactions with a threshold number of new customers within a timespan, then the payment processing system may provide an associated incentive to the merchant. For example, the payment processing system may waive processing fees for new customers for the rest of the time span, or the like. Some additional performance targets may be, increase sales volume at a geographical location beyond a threshold over a time span, increase the number of financial transactions by a particular percentage over a time span, process a particular number of financial transactions at a brick-and-mortar location over a time span, process a particular number of financial transactions using a mobile point-of-sale terminal over a time span, or the like.

In another example, a payment processing system may base financing terms on what information is in a merchant profile. For instance the payment processing system may determine that if a merchant were to process a particular volume of transactions then the merchant would qualify for a particular financing amount, e.g., the payment processing system may determine that if the merchant processed 10% more transactions over a time period, the merchant would be eligible for a 20% higher financing amount. Thus, the payment processing system may offer additional financing in exchange for a modification in the behavior (e.g., the volume of transactions) of the merchant.

In yet another example, a payment processing system may base an offer on geographical information associated with the merchants and/or the merchant's transactions. For example, the payment processing system may offer to forgive an amount of financing in response to a merchant doubling transaction volume at the merchant's worst performing location over a time span. In another example, a merchant may process only mobile transactions through the payment processing system and not those transactions from the merchant's brick-and-mortar store. The payment processing system may offer to reevaluate and adjust financing terms if the merchant performs a certain volume of transactions at the brick-and-mortar store.

Additionally, the timing and/or duration of an offer (e.g., delivery of an offer), required action, and/or incentive may be selected based on merchant profile information. For example, an offer may include a particular time span for the merchant to accept, thereby creating urgency and encouraging the merchant to more quickly achieve the required action. Similarly, the required action may also include a particular time span for completion. The particular time span provides the merchant with a tractable, achievable goal to improve her performance as well as benefit the payment processing system. Likewise, the incentive may be limited to a particular time span that entices the merchant to perform the desired action yet is not too costly to implement. As such the techniques described herein may encourage short term, fast-feedback, achievable goals for a merchant. For example, although an existing financing arrangement may involve a long term (e.g., months or years) contract, the offer proposes to operate over a short term, particular time span that is immediately or quickly achievable, or that is achievable appreciably sooner than the long term contract.

FIG. 1 illustrates an example architecture of a payment processing system 112 for enabling transactions between merchants 102 and buyers 104 and providing financing to merchants. In the example of FIG. 1, a buyer 104 may use any of a variety of payment cards 106 when participating in a point-of-sale (POS) transaction 108 with a merchant 102. In some embodiments, the payment cards 106 may include one or more magnetic stripes for providing payment card and buyer information when swiped in a card reader. In other embodiments, other types of payment cards or payment instruments may be used, for example smart cards having a built in integrated circuit including a memory chip, a radio frequency identification tag, card-less payment systems, and the like.

The payment communication system 100 in the example of FIG. 1 illustrates a merchant device 110 associated with the merchant 102 that participates in the payment service provided by a service provider (e.g., the merchant 102 may have an account with a payment processing service provider). The merchant device 110, as discussed elsewhere herein, may be any appropriate device configured to send and receive requests, messages, voice calls or other types of information over the network 114. In some embodiments the merchant device 110 may be a computing device (e.g. a mobile computing device) such as a smartphone or a tablet. In some embodiments, the merchant device 110 could be any device with a cellular connection and a communication port, such as an audio input/output port.

Each merchant device 110 may optionally include an instance of a merchant application 116 executed on the merchant device 110. The merchant application 116 may provide POS functionality to enable the merchant 102 to accept payments at a POS location using the merchant device 110. The merchant application 116 on the merchant device 110 may send transaction information via data network 114 (e.g., the internet) to the payment processing system 112, e.g., as the transaction is being conducted at the POS location. For example, the merchant application 116 may be a register application configured to receive an input from the merchant indicating a product or service for purchase by the buyer and receive payment card information from a payment card reader coupled with a mobile POS terminal to facilitate a transfer of funds from the buyer to the merchant. A mobile POS terminal may include a merchant device 110, a payment card reader, and one or more other components as described herein.

As depicted in FIG. 1, the merchant device 110 may communicate with the payment processing system 112 via a network 114. As discussed in greater detail herein, the network 114 may be coupled with or include portions of a telecommunications network for sending data and/or making voice calls using a variety of different communication protocols.

The payment processing system 112 enables a payment service provider to provide a payment service in which merchants 102 are able to conduct POS transactions 108 with a plurality of buyers 104, such as for selling services and/or products to the buyers 104. The payment processing system 112 may include a payment processing module 122 that receives transaction information for processing payments made through a merchant application 116, a financing engine 120 that calculates financing terms, qualifications, and offers defining an incentive and an action required of the merchant to receive the incentive, and merchant account information 118 including a merchant's transaction history. The payment processing system 112 and its components are described in further detail with reference to FIGS. 2 and 5 and elsewhere herein.

In some embodiments, the financing engine 120 may determine that the merchant 102 qualifies for up to a maximum amount of financing. In such embodiments, the merchant 102 can request an amount of financing that is the same, more, or less than the maximum amount of financing (e.g., a target cash advance amount). Alternatively or in addition to initially evaluating the merchant's 110 qualifications, the financing engine 120 may reevaluate the merchant and provide a higher cash advance amount or other incentive in response to the merchant participating in some action, as described in greater detail elsewhere herein.

The financing engine 120 is configured to evaluate factors associated with merchants, as described elsewhere herein, to determine whether any of those merchants qualify for financing and/or offers. Naturally, the factors for each merchant may vary based on the different types of financial transactions performed by that merchant and the various attributes of the merchant. Thus, the financing engine 120 is able to generate custom offers for each merchant. Offers for each merchant can be determined automatically without merchants necessarily requesting such offers.

Financing terms may include various terms and conditions relating to providing financing to a merchant. In some embodiments, the financing terms include an approved financing amount, repayment terms, repayment amount, a repayment duration, an interest rate, a processing fee, and various other terms relating to repayment, etc. For example, an approved financing amount may be all or a portion of a requested financing amount. The repayment amount may include a portion of financial transactions processed by a payment processing system, such as a percentage or a recurring or periodic fee as described elsewhere herein. In another example, the financing terms may include a fee for the financing, such as a set percentage of the approved financing amount, an interest rate, or a flat fee.

The financing engine 120 may also be capable of determining one or more incentives for a merchant to persuade the merchant to perform certain actions to increase the merchant's participation with the payment processing system 112. The financing engine 120 and its components are described in greater detail with reference to FIG. 2 and elsewhere herein.

Once the financing engine 120 determines that the merchant qualifies for an offer defining an incentive and an action required of the merchant to receive the incentive, the details (e.g., financing terms, incentive details, required action, time span, etc.) of the offer can be sent to the merchant via web interface or a merchant device 110, for example. Depending on the embodiment, the offer details can be sent to a computing device and/or server over a network, e.g., the Internet, through a web-based environment, or may be sent to the merchant through electronic communication, e.g., by e-mail or a text message.

The merchant can then accept the offer. Once the offer is accepted, the financing engine 120 can instruct the payment processing system 112 to disburse funds to the merchant in the amount specified in the offer and/or the financing terms. The payment system 112 can access merchant account information 118 that describes financial account information, e.g., a routing number for a checking account, for the merchant. In some embodiments, the payment processing system 112 electronically deposits the funds in the merchant's financial account with a bank. The merchant can then access the funds directly from his financial account. Other approaches to providing the merchant with the cash advance are possible including, for example, providing the merchant with a financial payment card having a pre-set spending limit in the amount of the cash advance.

Figure 4:
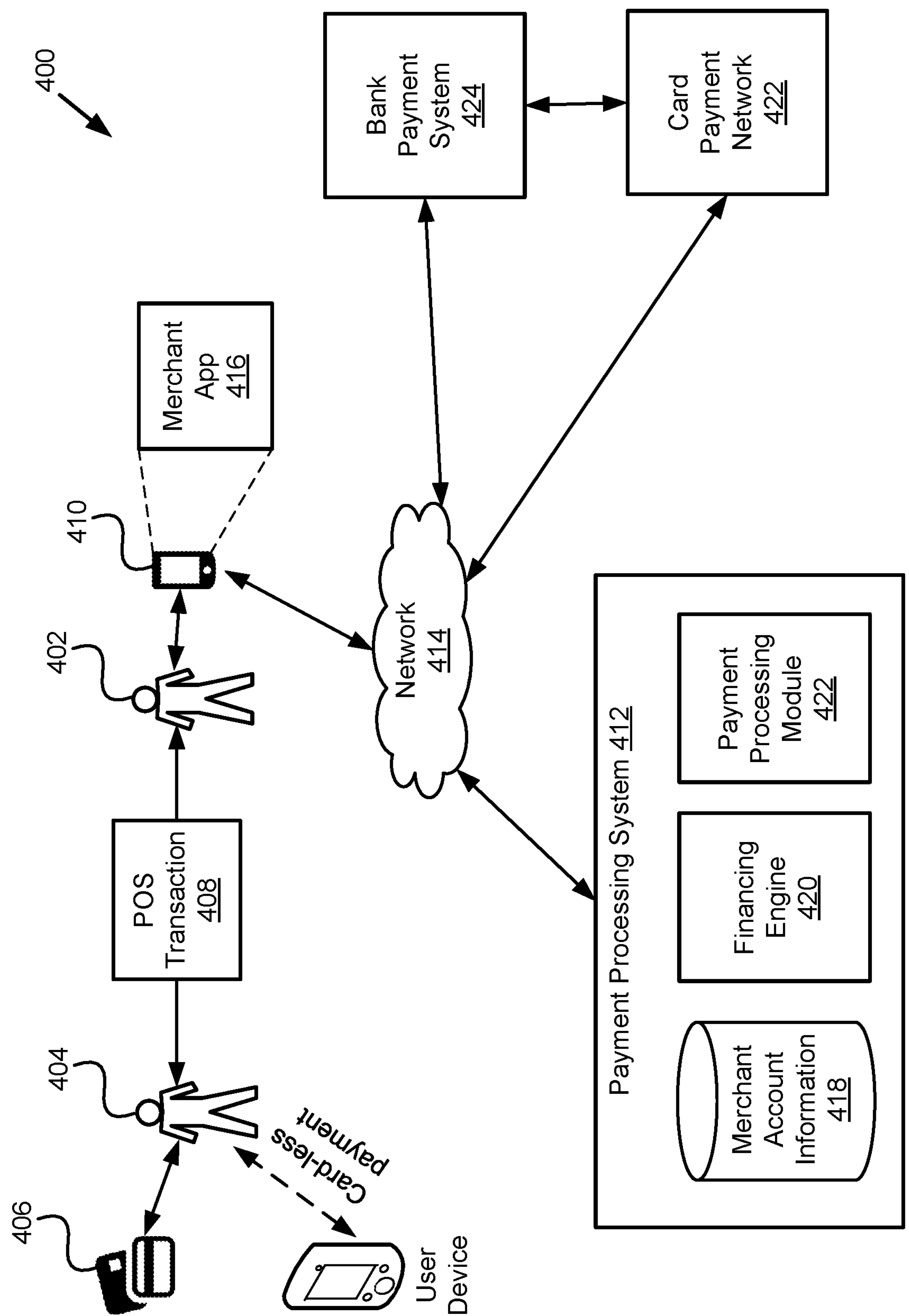
FIG. 4 illustrates an example architecture of a payment communication system for enabling transactions between merchants and buyers.

The payment processing module 122 is configured to process financial transactions between the merchant 102 and buyers 104, as described in reference to FIG. 4. In various embodiments, while processing financial transactions for the merchant 102, the payment processing module 122 is also configured to deduct a portion of the merchant's earnings from these financial transactions until the amount of financing provided to the merchant, together with the fee for the financing, is collected. In a like manner, the payment processing module 122 may be configured to collect, process, and designate funds from transactions to fulfill the provisions of an offer and/or financing terms according to the methods described in this disclosure. As mentioned, the amount deducted from financial transactions can be based on a rate for repayment for the financing and the fee, as specified in the financing terms or the incentive terms. For example, the amount may be a fixed amount deducted from each transaction, e.g., $5, or a percentage to be deducted from financial transactions conducted by the merchant, e.g., 10 percent. As mentioned, these deductions can be performed on a per-transaction basis or from financial transactions conducted by the merchant over a certain time period, e.g., hourly, daily, weekly, bi-weekly, monthly, or yearly.

The payment processing system 112 may also include merchant account information 118, which may be stored on a data storage device. To accept electronic payments for POS transactions, the merchant 102 may create a merchant account on the payment processing system 112 by providing information describing the merchant 102, including, for example, merchant name, contact information (e.g., telephone numbers, the merchant's address, and one or more financial accounts to which funds collected from buyers will be deposited). The data storage device is an information source (e.g., a non-transitory computer-readable medium) for storing and providing access to data. The data stored (e.g., the merchant account information 118) by the data storage device may be organized and queried using various criteria including stored data types and may include data tables, databases, or other organized collections of data. The components of the payment processing system 112 may be communicatively coupled to the data storage device and may access (e.g., read, write, modify, delete, etc.) the data stored therein.

The merchant account information 118 stored in the data storage device may include merchant profile information, such as financial account information (e.g., routing number for a checking account, balance, etc.), merchant financial history, related financing terms for past merchants, financing terms for current financing with the payment processing system 112, geographical location information, customer information, etc. Merchant financial history may include financial transaction data, account balance data, merchant attribute data, and other types of data, which are contemplated herein. For example, financial transaction data may include a history (frequency, amount, regularity, location, etc.) of financial transactions processed through the payment processing system 112, etc. The account balance data may include account balances for the merchant at one or more of the payment processing system 112 and/or one or more other financial institutions. Merchant attribute data may include the type of merchant (taxi service, food cart, retail store), whether the merchant has a brick-and-mortar store, etc., which may be reflective how prone the merchant business is to continue operations and be able to repay a cash advance or other financing.

The merchant account information 118 may be received from the payment processing module 122, another financial institution, and/or other possible third-party information sources. In some embodiments, the merchant account information 118 is aggregated by the payment processing module 122 and reflects the financial transactions processed through the payment processing system 112 by the payment processing module 122. For example, the merchant account information 118 may reflect the POS transactions 108 processed by the payment processing system 112 via the merchant device 110. In some embodiments, the merchant account information is received from another financial institution. For example, a financial institution may send merchant financial information to the payment processing system 112 regarding a merchant who holds an account with the financial institution. The payment processing system 112 may request permission from the merchant to allow the payment processing system 112 to collect and/or to share certain merchant account information.

Figure 2:
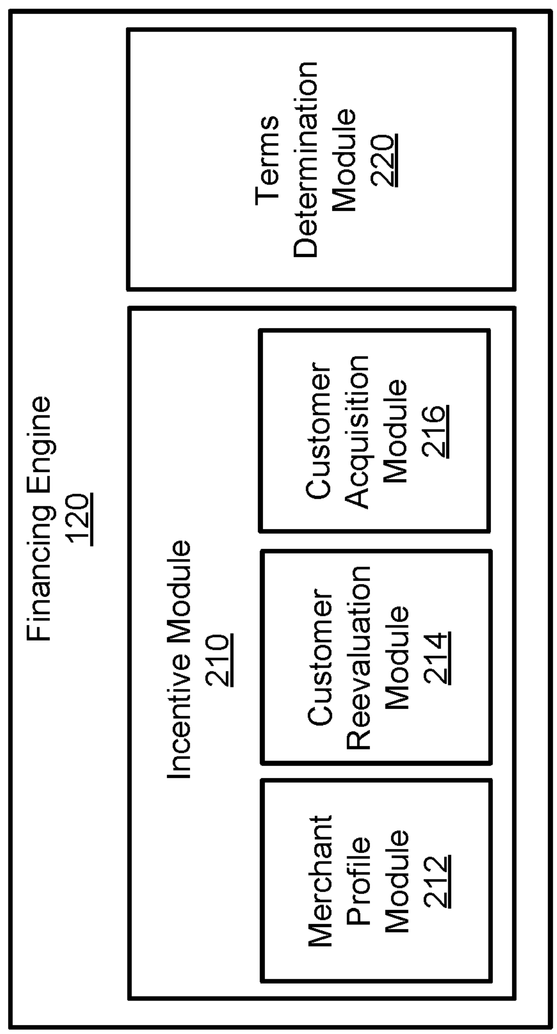
FIG. 2 illustrates an example block diagram of a financing engine.

FIG. 2 is a block diagram of an example embodiment of a financing engine 120. In the embodiment shown in FIG. 2, the financing engine 120 includes an incentive module 210 comprising a merchant profile module 212, a customer reevaluation module 214, and a customer acquisition module 216, and a terms determination module 220.

The terms determination module 220 is configured to determine whether a merchant qualifies for financing, e.g., a cash advance, by evaluating various factors associated with the merchant. Some of these factors can be based, in part, on evaluating financial transactions conducted by the merchant through the payment processing module 122. The terms determination module 220 also determines whether a merchant is eligible for financing, the amount of the cash advance, a fee for the cash advance (e.g., a percentage of the cash advance or a fixed fee), and a rate for repayment for the cash advance and the fee (e.g., a fixed amount or a percentage) to be deducted from financial transactions conducted by the merchant. Further, in conjunction with the incentive module 210, the terms determination module 220 can evaluate (and/or reevaluate) merchants to determine appropriate incentives for the merchants (e.g., a specific merchant based on attributes of the merchant, financial goals of the merchant, and financial goals of the payment processing service provider). These determinations can be made, for example, by applying various machine learning techniques, e.g., ensemble learning methods.

In various embodiments, the terms determination module 220 utilizes a classifier, for example, based on a random forest approach, to determine whether a merchant qualifies for financing. The classifier can be trained using training data that describes, for various merchants, respective payment history, the respective type of business, a respective gross payment volume (GPV) over a particular time period, the growth of the merchant's GPV over a particular time period, e.g., month over month growth, and whether the merchant has a brick-and-mortar store, to name some examples.

To determine whether a particular merchant qualifies for financing, the terms determination module 220 can utilize the classifier to determine whether factors describing the merchant qualify the merchant for financing. As mentioned, these factors can be, for example, the merchant's payment history, the type of business, and a GPV over a particular time period, e.g., over the past fiscal quarter or year. These factors can be determined from information aggregated by the payment processing module 122, retrieved from the merchant account information 118, received from another financial institution, etc.

The terms determination module 220 can also determine the amount of the financing, the fee for the financing, the rate of repayment, and other terms using similar techniques. For example, the terms determination module 220 can apply normal regression analysis on the merchant's previous financial transactions conducted by the merchant through the payment processing module 122, another financial institution, another payment processing system, etc. to make such determinations. In some embodiments, the fee for the financing is based on a specified percentage, e.g., 14 percent, of the funds. In some embodiments, the rate of repayment is a specified percentage, e.g., 10 percent. In some embodiments, the rate is determined based on targeting a 10-month repayment model. This model can be determined by forecasting the merchant's GPV for the subsequent year.

In some embodiments, the terms determination module 220 uses information collected from other merchants who use the payment processing system 112 to help determine eligibility and financing terms for a merchant. For example, the terms determination module 220 may compare the merchant to other merchants operating a similar business to determine likely revenue, rate of return, and/or likely repayment of the financing. The terms determination module 220 may communicate the financing terms to other components of the payment processing system 112 or another financial institution, direct the payment processing module 122 to transfer money to the merchant, etc. as described herein.

The financing engine 120 may also include an incentive module 210, which may communicate with the terms determination module 220 as well as other components of the payment communication system 100 to determine one or more offers defining an incentive and action required of the merchant to receive the incentive. In some instances, the incentive module 210 may include a merchant profile module 212, a customer reevaluation module 214, and/or a customer acquisition module 216. The merchant profile module 212 may be configured to evaluate the completeness of a merchant profile and to calculate incentives related to broadening and developing information contained in the merchant profile. The customer reevaluation module 214 may be configured to reevaluate merchants that have already accepted a financing offer from the payment processing system 112 to determine possible incentives to increase participation with the payment processing system 112 by those merchants. The customer acquisition module 216 may be configured to evaluate merchants that have not yet accepted financing or those merchants that did not previously qualify to receive financing from the payment processing system 112.

In some embodiments, the incentive module 210 aggregates and processes data from each of the modules 212, 214, 216, and/or 220 to determine an offer for a merchant. For instance, the incentive module 210 may be configured to assign weights to data and incentives from each of the components of the financing engine 120 in order to determine a most effective incentive to encourage the merchant to perform one or more actions. For example, the incentive module 210 may receive proposed incentives from both the merchant profile module 212 and the customer reevaluation module 214, and may select one or more of the incentives based on the assigned weights. In some instances, the incentive module 210 may combine multiple incentives into a single incentive based on the weights of each respective incentive. In another example, the incentive module 210 may rank the incentives provided by its components to provide an order to incentive offers (e.g., so that merchant is incentivized to provide additional information before being incentivized to take additional action). It should be understood that, although the components of the incentive module 210 are described as determining a singular incentive, the components may determine one or more discreet incentives, actions, and/or incentive terms.

In some embodiments, the merchant profile module 212 evaluates the information in a merchant profile to calculate incentives related to broadening and developing information contained in a merchant's profile (e.g., as stored in the merchant account information 118). For example, the merchant profile module 212 may determine whether information is missing from the merchant's profile and provide an incentive related to financing for the merchant to encourage the merchant to update and/or add to his profile information.

Likewise, in some instances the merchant profile module 212 evaluates the completeness of a merchant profile based on indications that data exists, but is not present in the merchant profile. For example, the merchant profile module 212 may compare the information in a particular merchant profile with the merchant profiles for other similar merchants. In yet another example, missing information may be indicated by inconsistent information in the merchant profile. For example, if a merchant has indicated that the merchant has a brick-and-mortar store, but none of the of the transactions processed for the merchant by the payment processing system 112 are entered into where the brick-and-mortar store is geographically located, then the merchant profile module 212 can create an incentive to prompt the merchant to update his profile information with additional location information.

The merchant profile module 212 may be configured to communicate with the other components of the payment processing system. For example, information completeness determinations as described above may be useful to the customer reevaluation module 214 and customer acquisition module 216 in performing their operations. Further, the merchant profile module 212 may receive information from the terms determination module 220 to perform its determinations. For example, the terms determination module 220 may determine that particular information used to calculate eligibility and financing terms are lacking for a merchant and transmit an indication of which data is lacking to the merchant profile module 212.

Once the merchant profile module 212 has determined whether and what information is lacking for a particular merchant, the merchant profile module 212 may provide an offer to the merchant (e.g., via the merchant device 110 and/or a web interface) to provide information. In some embodiments, the incentive may be predefined based on the type of information needed to complete the merchant profile.

The customer reevaluation module 214 reevaluates merchants that have already accepted a financing offer from the payment processing system 112 to determine possible incentives to increase participation with the payment processing system 112. Increased participation may include any action performed by the merchant with the payment processing system 112, such as providing additional information (e.g., merchant profile information), early repayment of previous financing, utilizing other services provided by the payment processing system 112, and processing a higher volume of transactions with the payment processing system 112, although other actions are possible.

Examples of possible incentives determined by the customer reevaluation module 214 may include but are not limited to: new financing terms for a current financing balance owed by the merchant, an increased amount of financing, a period of time or number of transactions where processing fees are not collected, a decreased fee for financing, one or more bonus payments toward a financing balance owed by a merchant, an early disbursement of future financing funds, an additional financing offer, a discount on other services associated with the payment processing system 112, etc. For example, the customer reevaluation module 214 may invite a merchant to utilize an inventory service associated with the payment processing system 112 or to process an additional 20% of transactions through the payment processing system 112 in exchange for an additional $5,000 in financing. In another example, the customer reevaluation module 214 may invite a merchant to repay the remaining $3,500 of current financing owed by the merchant in exchange for an immediate advancement of an additional $10,000 in financing. In yet another example, the customer reevaluation module 214 may invite a merchant to repay a cash advance owed by the merchant early in exchange for a week free of transaction fees (e.g., fees collected by the payment processing module 120 to process payments for a merchant's transactions).

The customer reevaluation module 214 may perform its operations (e.g., determining an incentive) in response to and based on a number of conditions and factors, such as: data received from the merchant profile module 212, an indication from the incentive module 210 that a merchant has provided additional information in response to an offer of an incentive (e.g., to reevaluate financing terms), a change in a merchant profile, data received from the terms determination module 220 indicating an area of potential improvement for the merchant, an indication from the payment processing system 112 that additional funds are available for financing, etc.

As an illustration, the customer reevaluation module 214, in conjunction with the terms definition module 220, may determine that if a merchant were to processes a 20% higher volume of transactions through the payment processing system 112, then the merchant would be eligible for an additional $5,000 in financing. In another example, the customer reevaluation module 214 may determine that the cash advance funds previously disbursed to the merchant would receive a certain rate of return if reinvested by the payment processing service provider elsewhere (e.g., new financing to the same or other merchants, other investments, applied to other services provided by the service provider, etc.). The customer reevaluation module 214 may calculate, based on the certain rate of return, that an incentive may be provided to the merchant in exchange for early repayment of the financing. For example, the customer reevaluation module 214 may determine a maximum incentive for the merchant based on the difference between the calculated rate of return and the amount owed (although other factors such as risk, transaction costs, evaluation and underwriting costs, timing, etc. may also affect the terms of the incentive). In some instances, the customer reevaluation module 214 may simply determine that a merchant is or has been a loyal customer of the payment processing service provider and may offer a predetermined incentive associated with some action performed by the merchant. These examples are not intended to be exhaustive and are provided for illustrative purposes.

The customer acquisition module 216 is configured to evaluate merchants who have not yet accepted financing or those merchants who did not previously qualify to receive financing from the payment processing system 112. In some embodiments, the customer acquisition module 216 evaluates a merchant based on whether the merchant is utilizing other services provided by the payment processing system 112 such as an inventory tracking service, an invoice service, an analytics service, a direct payment service, a financing service, etc. For example, the customer acquisition module 216 may use information from an inventory service provided by the payment processing service provider to determine whether an offer may be provided to a merchant to increase the merchant's use of the payment processing service (or any other service provided by the payment processing service provider). In one such example, if a merchant processes some transactions using the payment processing system 112, but the merchant's inventory data shows that the merchant is completing a greater volume of transactions, the customer acquisition module 216 may offer an incentive of financing (or additional financing) if the merchant increases her transaction volume processed using the payment processing system 112.

The customer acquisition module 216 may perform its operations based on the same conditions and factors as the customer reevaluation module 214. In some instances, the customer acquisition module 216 reevaluates merchants who have previously applied for financing, but were rejected or did not accept the financing terms offered to them. For example, the customer acquisition module 216 may receive information from the terms definition module 220 reflecting the factors underlying the decision not to approve the merchant for a requested cash advance amount. For instance, the terms definition module 220 may determine that a merchant would need to process an additional 10% of its current transaction volume in order to be approved for a requested financing amount, so the terms definition module 220 sends this data to the customer acquisition module 216, which uses the data to invite the merchant to process additional transactions and, in some embodiments, indicate the volume required to qualify for financing.

In some embodiments, the customer acquisition module 216 evaluates merchants who have not yet applied for or accepted financing in order to provide those merchants an additional offer to receive financing according to the methods described herein. As discussed in reference to the customer reevaluation module 214, the customer acquisition module 216 may also determine incentives to influence merchants to perform certain actions involving payment volume, other services, etc., as discussed above. Additionally, in some embodiments, the customer acquisition module 216 may be configured to evaluate the needs of a merchant based on the merchant profile, past requests for financing, inventory data, invoicing data, transaction volume, etc. to determine the potential needs of the merchant to be used in an incentive to influence the merchant to perform some act, such as increasing participation with the payment processing system 112.

In some embodiments, the customer acquisition module 216 may scan merchant profiles for potential opportunities to increase participation, may calculate and offer specific incentives for all merchants, or may broadly offer certain incentives to groups or all merchants.

As mentioned above, the incentive module 210 may combine, sort, and/or order the data received from the merchant profile module 212, the customer reevaluation module 214, and the customer acquisition module 216. In some instances, the incentive module 210 may determine which of multiple incentives or ranges of incentives to select for transmission to the merchant. For example, the incentive module 210 may determine which incentive and corresponding merchant action to select from a range of potential suggestions based on predetermined weighting, combination, and ordering techniques.

It should be understood that the embodiments and examples are provided by way of illustration and should not be construed as limiting. Moreover, it should also be understood that the engines and modules as well as their functions and operations may be further delineated, combined, rearranged, and/or adjusted without departing from the scope of the subject matter described herein.

Figure 3:
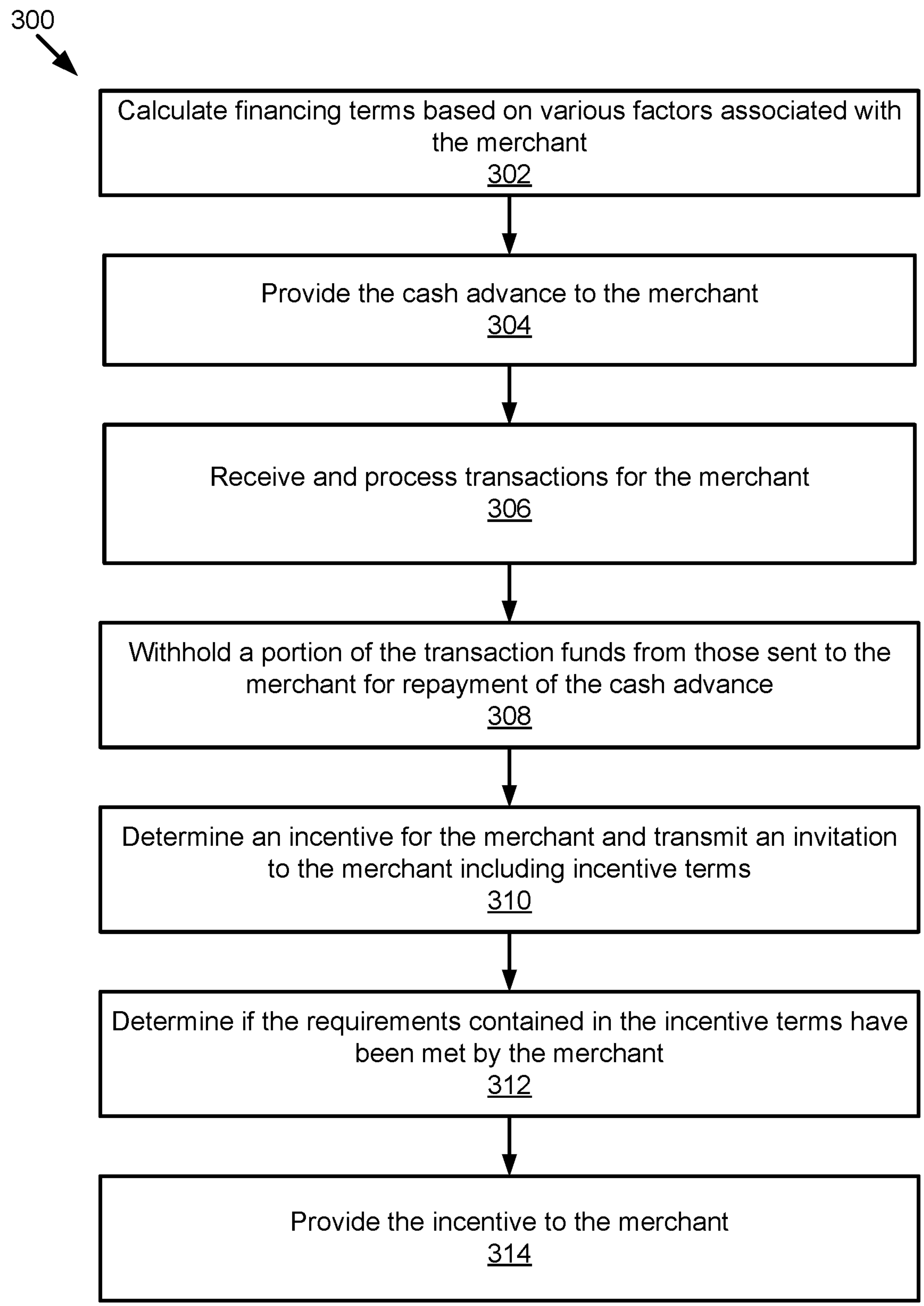
FIG. 3 is a block diagram of an example process for enabling merchant financing, reevaluating terms and/or repayment of the financing, and providing an incentive to the merchant.

FIG. 3 is a block diagram of an example process 300 for enabling merchant financing, reevaluating terms and/or repayment of the financing, and providing an incentive to the merchant. The processes described in FIG. 3 are illustrated as a collection of blocks in a logical flow diagram, which represents a sequence of operations, some or all of which can be implemented in hardware, software, or a combination thereof. The order in which the blocks are described should not be construed as a limitation. Any number of the described blocks can be combined in any order and/or performed in parallel to implement the processes, and not all of the blocks need be executed. For ease of description, the processes are described with reference to the environments, architectures and systems described in the examples herein, although the processes may be implemented in a wide variety of other environments, architectures and systems.

At 302, the payment processing system 112 calculates financing terms based on various factors associated with the merchant. For example, as described above, some of these factors can be based, in part, on financial transactions conducted by the merchant through the payment processing system 112. The financing terms may include, for example, a financing amount, a fee for the financing (e.g., a percentage of the amount financed or a fixed fee), and a rate for repayment for the amount financed and the fee (e.g., an amount to be withheld from financial transactions processed for the merchant through the payment processing system 112). At 304, the payment processing system 112 provides the financed amount to the merchant. For example, the payment processing system 112 may transmit the funds via wire transfer, deposit the funds in a financial account associated with the merchant, or the like.

At 306, the payment processing system 112 receives and processes POS transactions for a merchant. For example, as described elsewhere herein, the payment processing system may process financial transactions between the merchant and customers. At 308, the payment processing system 112 withholds a portion of the transaction funds from those sent to the merchant. For example, for each POS transaction, the payment processing system 112 may withhold 10% for repayment of the amount financed according to the calculated MCA terms, and send the remaining revenue to the merchant.

At 310, the payment processing system 112 determines an incentive for the merchant and transmits an offer defining the incentive and an action required of the merchant to receive the incentive (e.g., a performance target). For example, as described elsewhere herein, the incentive terms may include the action to be performed by the merchant as well as when and what incentive will be provided in exchange for the merchant's actions.

At 312, the payment processing system 112 determines if the requirements contained in the incentive terms have been met by the merchant. In some embodiments, the financing engine 120 may track a merchant's activities until the requirements have been met. For example, the financing engine may monitor the transactions processed for the merchant through the payment processing system 112 to determine if the volume of transactions has increased according to the incentive terms. When the payment processing system 112 determines that the requirements have been met, the payment processing system may provide the incentive to the merchant at 314.

Figure 6:
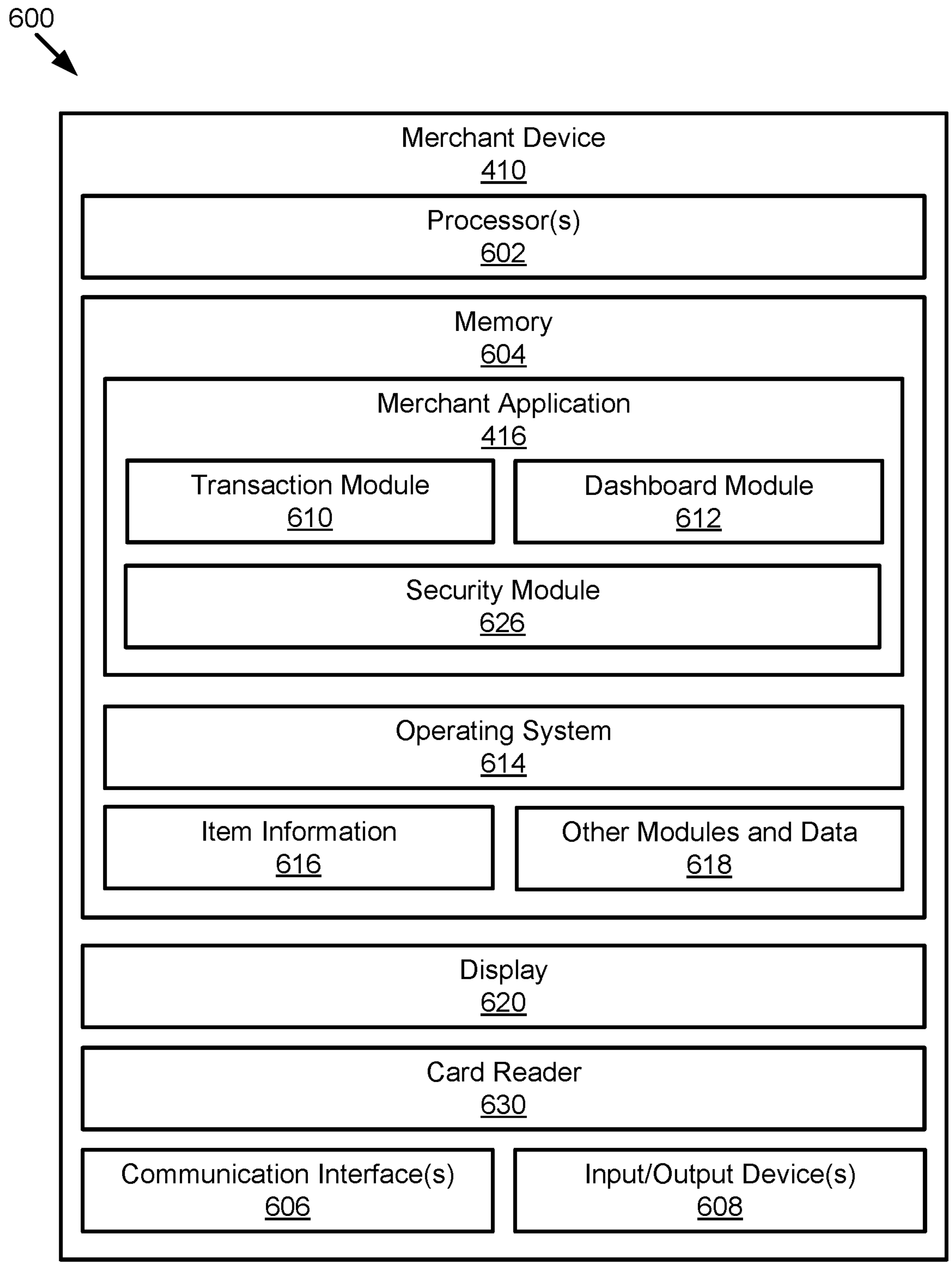
FIG. 6 illustrates an example block diagram of components of a merchant device.

FIG. 4 illustrates an example architecture of a payment communication system 400 for enabling transactions between merchants 402 and buyers 404. In the example of FIG. 4, a buyer 404 may use any of a variety of payment cards 406 when participating in a POS transaction 408 with a merchant 402. For example, a buyer 404 may typically have payment cards 406 such as credit cards, debit cards, prepaid cards, and the like, that the buyer 404 may use for conducting POS transaction 408. In some embodiments, the payment cards 406 may include one or more magnetic strips for providing payment card and buyer information when swiped in a card reader 630 (e.g., as depicted in FIG. 6). In other embodiments, other types of payment cards may be used, for example smart cards having a built in integrated circuit including a memory chip, a radio frequency identification tag, and the like. In some embodiments, card-less payment methods may be used. For example, a virtual payment card may be stored on a user device such as a smart phone or other device and transmittable via near field communication or other suitable means.

The payment communication system 400 in the example of FIG. 4 illustrates a merchant device 410 associated with the merchant 402 that participates in the payment service provided by the service provider of the payment processing system 412. As discussed elsewhere herein, the merchant device 410 may be a computing device (e.g., a mobile computing device) able to communicate with the payment processing system 412, and with various other computing devices, through suitable communication protocols, interfaces, and networks, including network 414. Further, the merchant device 410 may be any appropriate device operable to send and receive requests, messages, or other types of information over the network 414. Additionally, while only a single merchant device 410 is illustrated in the example of FIG. 4, in some embodiments there may be additional merchant devices depending on the number of merchants participating in the payment service.

Each merchant device 410 may include an instance of a merchant application 416 executed on the merchant device. The merchant application 416 may provide POS functionality to enable the merchant 402 to accept payments at a POS location using the merchant device 410. In some types of businesses, the POS location may correspond to a store or other place of business of the merchant, and thus, may be a fixed location that typically does not change on a day-to-day basis. In other types of businesses, however, the POS location may change from time to time, such as in the case that the merchant 402 operates a food truck, is a street vendor, a cab driver, or has an otherwise mobile business, e.g., in the case of merchants who sell items at buyers' homes, buyers' places of business, and so forth.

Accordingly, the merchant 402 and the buyer 404 may conduct a POS transaction 408 by which the buyer 404 acquires an item or service from the merchant 402 at a POS location. The merchant application 416 on the merchant device 410 may send transaction information to the payment processing system 412, e.g., as the transaction is being conducted at the POS location. In some embodiments, such as if a particular merchant device 410 is not connected to the network 414 and is therefore processing transactions offline, the transaction information may be sent in a batch at a subsequent point in time or using other suitable techniques. In some embodiments, the transaction information may be sent via SMS, MMS, or a voice call.

The transaction information may include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), data describing a buyer, any type of data that is received upon a buyer's authentication into a social network, if any, and various other types of information.

To accept electronic payments for POS transactions, the merchant 402 typically creates a merchant account with the payment processing system 412 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant account information 418 in a secure database. Further, the merchant information may include a merchant profile created for each merchant. The merchant profile may include information about the merchant 402 and transaction information associated with transactions conducted by the merchant.

The payment processing system 412 enables a service provider to provide a payment service in which merchants 402 are able to conduct POS transactions 408 with a plurality of buyers 404, such as for selling services and/or products to the buyers 404. The payment processing system 412 may include one or more servers that are configured to process secure electronic financial transactions, e.g., payment during a POS transaction 408, by communicating with the merchant device 410, card payment networks 422, and bank or other financial institution payment systems 424. The payment processing system 412 includes a payment processing module 422 that receives transaction information for processing payments made through the merchant application 416. For example, the payment processing module 422 may receive transaction information, such as an amount of the transaction, and may verify that a particular payment card 406 can be used to pay for the transaction, such as by contacting a card clearinghouse of a card payment network 422. Furthermore, in some examples, the payment processing module 422 may redirect payment information for transactions to be made using payment cards 406 to a bank, or other financial institution, payment system 424. In other embodiments, the merchant device 410 may communicate directly with an appropriate card payment network 422 or bank payment system 424 for approving or denying a transaction using a particular payment card 406 for a POS transaction 408. Additional details of payment processing are discussed below.

As introduced above, the payment processing system 412 may be configured to communicate with one or more systems of a card payment network 422 (e.g., MasterCard®, VISA®, or the like) over the network 414 to conduct financial transactions electronically. The payment processing system 412 may also communicate with one or more bank payment systems 424 of one or more banks over the network 414. For example, the payment processing system 412 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 422. A payment card issuing bank may issue payment cards 406 to buyers 404, and may pay acquiring banks for purchases made by cardholders to which the issuing bank has issued a payment card 406. Accordingly, in some embodiments, the systems of an acquiring bank may be included in the card payment network 422 and may communicate with systems of a payment card issuing bank to obtain payment. Further, in some embodiments, bank payment systems 424 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The network 414 can be a conventional type, wired or wireless, and may have numerous different configurations including a star configuration, token ring configuration, or other configurations. Furthermore, the network 414 may include a local area network (LAN), a wide area network (WAN) (e.g., the internet), and/or other interconnected data paths across which multiple devices may communicate. In some embodiments, the network 414 may be a peer-to-peer network. The network 414 may also be coupled with or include portions of a telecommunications network for sending data using a variety of different communication protocols. In some embodiments, the network 414 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 4 illustrates one network 414 coupled to the merchant device, payment processing system, card payment network, and bank, in practice one or more networks 414 can connect these entities.

Figure 5:
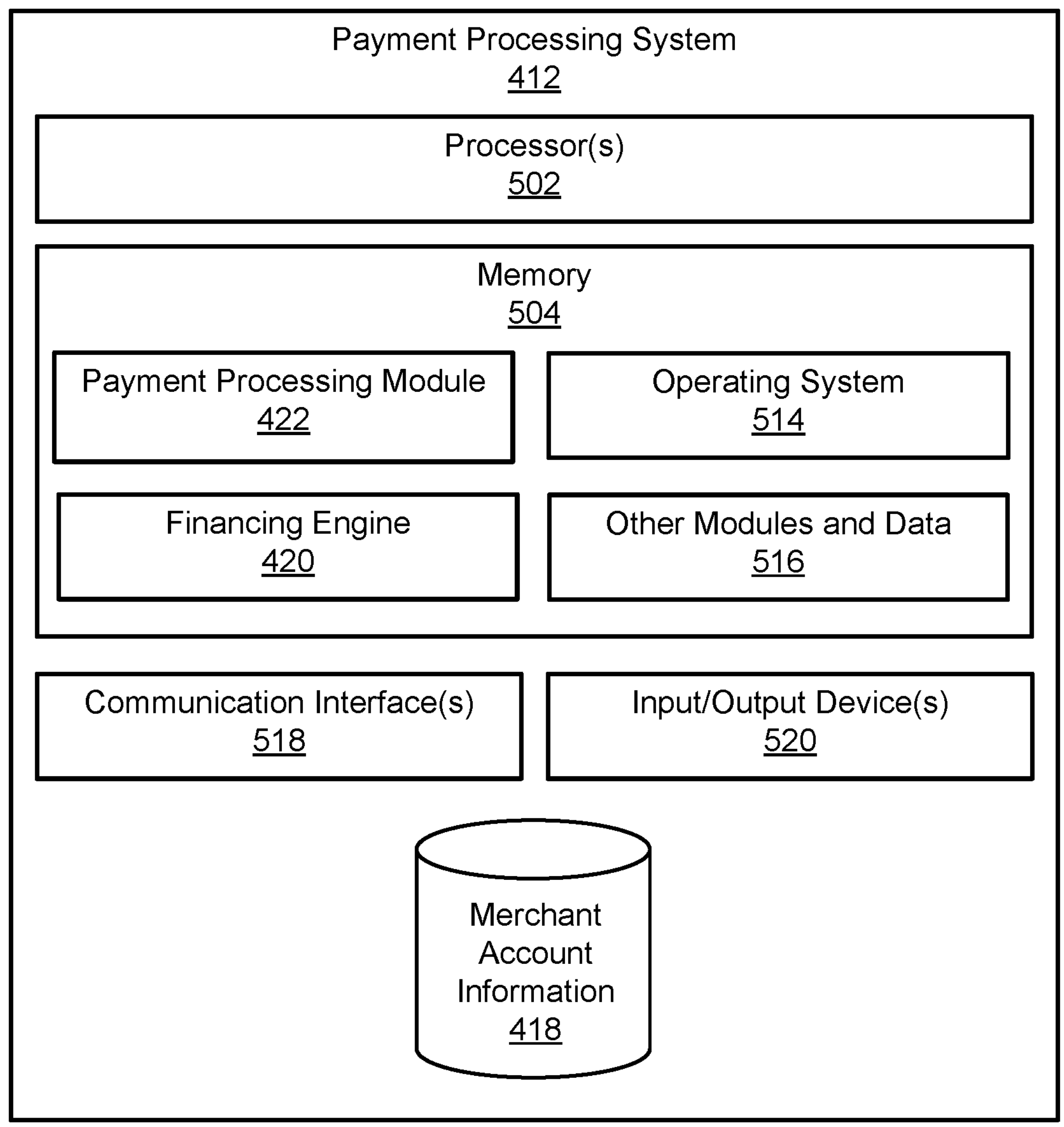
FIG. 5 illustrates an example block diagram of components of a payment processing system.

FIG. 5 is a block diagram 500 illustrating select components of an example payment processing system 412 according to some embodiments. The payment processing system 412 may be any suitable type of computing device capable of sending communications and performing the functions according to the techniques described herein and may be operated by a service provider that provides the payment processing service. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 412 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 412. Multiple payment processing systems 412 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 5, the payment processing system 412 includes one or more processors 502, one or more memory devices 504, one or more communication interfaces 518, and one or more input/output devices 520. These components may be similar to those described above with reference to FIG. 4 and elsewhere herein.

The memory 504 may be used to store and maintain any number of functional components or modules that are executable by the processor 502. In some embodiments, these functional components comprise instructions or programs that are executable by the processor 502 and that, when executed, implement operational logic for performing the actions and services attributed above to the payment processing system 412. Functional components of the payment processing system 412 stored in the memory 504 may include the payment processing module 422, the financing module 420, the operating system 514, and other modules and data 516. These components may be similar to those described with reference to FIG. 4 and elsewhere herein. In addition, the memory 504 may store data used for performing the operations described herein. Thus, the memory 504 may store merchant information 418, including the merchant profiles. Further, the payment processing system 412 may include many other logical, programmatic and physical components, of which those described above are merely examples that are related to the discussion herein.

FIG. 6 is a block diagram 600 illustrating select components of an example merchant device 410 according to some embodiments. The merchant device 410 may be any suitable type of computing device, e.g., portable, semi-portable, semi-stationary, or stationary. Some examples of the merchant device 410 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 6, the merchant device 410 includes at least one processor 602, a memory 604, one or more communication interfaces 606, and one or more input/output (I/O) devices 608. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some embodiments, the processor 602 may be one or more hardware processors and/or logic circuits of any suitable type specifically programmed or configured to execute the algorithms and processes described herein by performing various input/output, logical, and/or mathematical operations. The processor 602 can be configured to fetch and execute computer-readable processor-executable instructions stored in the memory 604.

Depending on the configuration of the merchant device 410, the memory 604 may be an example of tangible non-transitory computer storage media (e.g., computer-readable media) and may include volatile and nonvolatile memory and/or removable and non-removable media implemented in any type of technology for storage of information such as computer-readable processor-executable instructions, data structures, program modules or other data. The computer-readable media may include, but is not limited to, RAM, ROM, EEPROM, flash memory, solid-state storage, magnetic disk storage, optical storage, and/or other computer-readable media technology. Further, in some cases, the merchant device 410 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602.

The memory 604 may be used to store and maintain any number of functional components or modules that are executable by the processor 602. In some embodiments, these functional components comprise instructions or programs that are executable by the processor 602 and that, when executed, implement operational logic for performing the actions and services attributed above to the merchant device 410. Functional components of the merchant device 410 stored in the memory 604 may include the merchant application 416. In this example, the merchant application 416 includes a transaction module 610, a dashboard module 612, and a security module 626, although it may also contain modules or portions of modules assigned herein to the payment processing system 412. The transaction module 610, for example, presents an interface, such as a payment interface to enable the merchant to conduct transactions, receive payments, and so forth, as well as for communicating with the payment processing system 412 for processing payments and sending transaction information. The dashboard module 612 enables the merchant to manage the merchant's account, the merchant profile, merchant preferences, view saved or new pricing information, communicate with the payment processing system 412 regarding cash advances, offers of incentives, invitations, and the like. The security module 626 may, as described herein, enable the merchant application 416 to encrypt and decrypt transaction information communicated between the merchant device 410 and other system components. Additional functional components may include an operating system 614 for controlling and managing various functions of the merchant device 410 and for enabling basic user interactions with the merchant device 410.

In addition, the memory 604 may also store data, data structures and the like, that are used by the functional components. For example, data stored by the memory 604 may include item information 616 that includes information about the items offered by the merchant, which may include a list of items currently available from the merchant, images of the items, descriptions of the items, prices of the items, and so forth. For instance, when the merchant 402 is setting up the merchant application 416 to accept payments for particular items offered by the merchant 402, the merchant may enter the item information 616 for the particular items. Depending on the type of the merchant device 410, the memory 604 may also optionally include other functional components and data, such as other modules and data 616, which may include programs, drivers, etc., and the data used or generated by the functional components. Further, the merchant device 410 may include many other logical, programmatic and physical components, of which those described are merely examples that are related to the discussion herein.

The communication interface(s) 606 may include one or more interfaces and hardware components for enabling communication with various other devices, such as over the network(s) 414 or directly. For example, communication interface(s) 606 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 606 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 606 also provides other conventional connections to the network 414 for distribution of files and/or media objects using standard network protocols such as TCP/IP, HTTP, HTTPS and SMTP as will be understood.

The merchant device 410 may further include a display 620, which may employ any suitable display technology. For example, the display 620 may be a liquid crystal display, a plasma display, a light emitting diode display, an OLED (organic light-emitting diode) display, an electronic paper display, or any other suitable type of display able to present digital content thereon. In some embodiments, the display 620 may have a touch sensor associated with the display 620 to provide a touchscreen display configured to receive touch inputs for enabling interaction with a graphical user interface presented on the display 620. Accordingly, embodiments described herein are not limited to any particular display technology. Alternatively, in some embodiments, the merchant device 410 may not include the display 620, and information may be presented by other means, such as aurally.

The merchant device 410 may further include one or more I/O devices 608. The I/O devices 608 may include speakers, a microphone, a camera, and various user controls (e.g., buttons, a joystick, a keyboard, a keypad, etc.), a haptic output device, and so forth.

In addition, the merchant device 410 may include or may be connectable to a payment card reader 630. In some embodiments, the payment card reader 630 may plug in to a port in the merchant device, such as a microphone/headphone port, a data port, or other suitable port. The payment card reader 630 may include a card interface for reading a magnetic stripe or an integrated circuit of a payment card 606, and further may include encryption technology for encrypting the information read from the payment card 406. Alternatively, numerous other types of payment card readers 630 may be employed with the merchant devices 410 herein, depending on the type and configuration of the merchant device 410.

As used here, the term "payment card" or "payment instrument" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some embodiments, a payment card or payment instrument may also include a virtual payment card stored on a device such as a smart phone or other device and transmittable, for example, via near field communication or other suitable means.

Other components included in the merchant device 410 may include various types of sensors (not shown), which may include a GPS device, an accelerometer, gyroscope, compass, proximity sensor, and the like. Additionally, the merchant device 410 may include various other components that are not shown, examples of which include removable storage, a power source, such as a battery and power control unit, and so forth.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, the techniques introduced herein can be embodied in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Finally, the algorithms presented herein are not inherently related to any particular computer or other apparatus. Various general-purpose systems may be used with programs in accordance with the teachings herein, or it may prove convenient to construct more specialized apparatus to perform the required method steps. In addition, the techniques introduced herein are not described with reference to any particular programming language. It will be appreciated that a variety of programming languages may be used to implement the techniques as described herein.

The foregoing description of the embodiments has been presented for the purposes of illustration and description. It is not intended to be exhaustive or to limit the techniques to the precise form disclosed. Many modifications and variations are possible in light of the above teaching. It is not intended that the scope of the embodiments be limited by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, or similar components known to those of ordinary skill in the art of computer programming. Additionally, the techniques are in no way limited to implementation in any specific programming language, or for any specific operating system or environment. Accordingly, the detailed description is intended to be illustrative, but not limiting, of the scope of the claims, which are set forth below.

What is claimed:

1. A method comprising:

receiving, by one or more processors of a payment processing system, information from a plurality of merchant devices associated with a plurality of merchants, respectively, the information including transaction information of transactions performed between the plurality of merchants and a plurality of customers;

determining, by the one or more processors, based on a machine learning classifier trained on the information received from the plurality of merchant devices, a first merchant of the plurality of merchants who qualifies for financing, the machine learning classifier configured to determine the first merchant based on a plurality of factors describing the first merchant determined from the information;

sending, by the one or more processors, based on the information, an incentive for the first merchant to achieve a target during a specified time period, the incentive indicating conditions applied to existing financing or a new financing offer between the first merchant and the payment processing system;

tracking, by the one or more processors, one or more merchant actions by the payment processing system for the first merchant during the specified time period;

determining, by the one or more processors, based on tracking the merchant actions, that the first merchant has achieved the target within the specified time period for receiving the incentive; and in response to the first merchant achieving the target, applying, by the one or more processors, one or more conditions associated with the incentive to the existing financing or the new financing offer for the first merchant.

2. The method as recited in claim 1, wherein the incentive includes the new financing offer, the method further comprising:

in response to the first merchant achieving the target, applying the one or more conditions associated with the incentive to the new financing offer for the first merchant by sending the new financing offer to the merchant device associated with the first merchant.

3. The method as recited in claim 2, wherein the target is one of:

processing a threshold volume of transactions with the payment processing system;

utilizing at least one other service provided by the payment processing system;

early repayment of previous financing provided by the payment processing system;

performing a threshold volume of transactions with repeat customers; or performing a threshold volume of transactions with new customers.

4. The method as recited in claim 1, further comprising:

in response to the first merchant achieving the target prior to expiration of the specified time period, applying the one or more conditions associated with the incentive to the existing financing or the new financing offer for the first merchant prior to the expiration of the specified time period.

5. The method as recited in claim 1, wherein the target includes a requirement that the first merchant conduct transactions with a threshold number of customers during the specified time period, the method further comprising:

accessing a database including merchant account information for the first merchant to determine that the first merchant has achieved the target; and applying the incentive by modifying repayment terms provided to the first merchant with the existing financing or the new financing offer.

6. The method as recited in claim 1, wherein the target includes a requirement that the first merchant increase a sales volume at a geographical location beyond a threshold sales volume during the specified time period, the method further comprising:

accessing a database including merchant account information for the first merchant to determine that the first merchant has achieved the target; and applying the incentive by modifying repayment terms provided to the first merchant with the existing financing or the new financing offer.

7. The method as recited in claim 1, wherein the incentive includes decreasing fees withheld from the first merchant for the plurality of financial transactions processed for the first merchant by the payment processing system.

8. A system comprising:

one or more processors configured by executable instructions to perform operating that include:

receiving, by one or more processors of a payment processing system, information from a plurality of merchant devices associated with a plurality of merchants, respectively, the information including transaction information of transactions performed between the plurality of merchants and a plurality of customers;

determining, by the one or more processors, based on a machine learning classifier trained on the information received from the plurality of merchant devices, a first merchant of the plurality of merchants who qualifies for financing, the machine learning classifier configured to determine the first merchant based on a plurality of factors describing the first merchant determined from the information;

sending, by the one or more processors, based on the information, an incentive for the first merchant to achieve a target during a specified time period, the incentive indicating conditions applied to existing financing or a new financing offer between the first merchant and the payment processing system;

tracking, by the one or more processors, one or more merchant actions by the payment processing system for the first merchant during the specified time period;

determining, by the one or more processors, based on tracking the merchant actions, that the first merchant has achieved the target within the specified time period for receiving the incentive; and in response to the first merchant achieving the target, applying, by the one or more processors, one or more conditions associated with the incentive to the existing financing or the new financing offer for the first merchant.

9. The system as recited in claim 8, wherein the incentive includes the new financing offer, the operations further comprising:

in response to the first merchant achieving the target, applying the one or more conditions associated with the incentive to the new financing offer for the first merchant by sending the new financing offer to the merchant device associated with the first merchant.

10. The system as recited in claim 9, wherein the target is one of:

processing a threshold volume of transactions with the payment processing system;

utilizing at least one other service provided by the payment processing system;

early repayment of previous financing provided by the payment processing system;

performing a threshold volume of transactions with repeat customers; or performing a threshold volume of transactions with new customers.

11. The system as recited in claim 8, the operations further comprising:

in response to the first merchant achieving the target prior to expiration of the specified time period, applying the one or more conditions associated with the incentive to the existing financing or the new financing offer for the first merchant prior to the expiration of the specified time period.

12. The system as recited in claim 8, wherein the target includes a requirement that the first merchant conduct transactions with a threshold number of customers during the specified time period, the operations further comprising:

accessing a database including merchant account information for the first merchant to determine that the first merchant has achieved the target; and applying the incentive by modifying repayment terms provided to the first merchant with the existing financing or the new financing offer.

13. The system as recited in claim 8, wherein the target includes a requirement that the first merchant increase a sales volume at a geographical location beyond a threshold sales volume during the specified time period, the operations further comprising:

accessing a database including merchant account information for the first merchant to determine that the first merchant has achieved the target; and applying the incentive by modifying repayment terms provided to the first merchant with the existing financing or the new financing offer.

14. The system as recited in claim 8, wherein the incentive includes decreasing fees withheld from the first merchant for the plurality of financial transactions processed for the first merchant by the payment processing system.

15. One or more non-transitory computer-readable media storing instructions executable by one or more processors of a payment system to cause the one or more processors to perform operations comprising:

receiving, by the one or more processors, information from a plurality of merchant devices associated with a plurality of merchants, respectively, the information including transaction information of transactions performed between the plurality of merchants and a plurality of customers;

determining, by the one or more processors, based on a machine learning classifier trained on the information received from the plurality of merchant devices, a first merchant of the plurality of merchants who qualifies for financing, the machine learning classifier configured to determine the first merchant based on a plurality of factors describing the first merchant determined from the information;

sending, by the one or more processors, based on the information, an incentive for the first merchant to achieve a target during a specified time period, the incentive indicating conditions applied to existing financing or a new financing offer between the first merchant and the payment processing system;

tracking, by the one or more processors, one or more merchant actions by the payment processing system for the first merchant during the specified time period;

determining, by the one or more processors, based on tracking the merchant actions, that the first merchant has achieved the target within the specified time period for receiving the incentive; and in response to the first merchant achieving the target, applying, by the one or more processors, one or more conditions associated with the incentive to the existing financing or the new financing offer for the first merchant.

16. The one or more non-transitory computer-readable media as recited in claim 15, wherein the incentive includes the new financing offer, the operations further comprising:

in response to the first merchant achieving the target, applying the one or more conditions associated with the incentive to the new financing offer for the first merchant by sending the new financing offer to the merchant device associated with the first merchant.

17. The one or more non-transitory computer-readable media as recited in claim 16, wherein the target is one of:

processing a threshold volume of transactions with the payment processing system;

utilizing at least one other service provided by the payment processing system;

early repayment of previous financing provided by the payment processing system;

performing a threshold volume of transactions with repeat customers; or performing a threshold volume of transactions with new customers.

18. The one or more non-transitory computer-readable media as recited in claim 15, the operations further comprising:

in response to the first merchant achieving the target prior to expiration of the specified time period, applying the one or more conditions associated with the incentive to the existing financing or the new financing offer for the first merchant prior to the expiration of the specified time period.

19. The one or more non-transitory computer-readable media as recited in claim 15, wherein the target includes a requirement that the first merchant conduct transactions with a threshold number of customers during the specified time period, the operations further comprising:

accessing a database including merchant account information for the first merchant to determine that the first merchant has achieved the target; and applying the incentive by modifying repayment terms provided to the first merchant with the existing financing or the new financing offer.

20. The one or more non-transitory computer-readable media as recited in claim 15, wherein the incentive includes decreasing fees withheld from the first merchant for the plurality of financial transactions processed for the first merchant by the payment processing system.

* * * * *